US011352513B2

(12) United States Patent
Torfs et al.

(10) Patent No.: US 11,352,513 B2
(45) Date of Patent: Jun. 7, 2022

(54) UV CURABLE INKJET INKS FOR PRINTING ON GLASS

(71) Applicant: AGFA NV, Mortsel (BE)

(72) Inventors: Rita Torfs, Mortsel (BE); Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 762 days.

(21) Appl. No.: 15/535,123

(22) PCT Filed: Dec. 11, 2015

(86) PCT No.: PCT/EP2015/079353
§ 371 (c)(1),
(2) Date: Jun. 12, 2017

(87) PCT Pub. No.: WO2016/096632
PCT Pub. Date: Jun. 23, 2016

(65) Prior Publication Data
US 2017/0342282 A1    Nov. 30, 2017

(30) Foreign Application Priority Data

Dec. 18, 2014  (EP) .................................... 14198761

(51) Int. Cl.
| | |
|---|---|
| *C09D 11/101* | (2014.01) |
| *B41M 5/00* | (2006.01) |
| *B41M 7/00* | (2006.01) |
| *C09D 11/322* | (2014.01) |
| *C09D 11/38* | (2014.01) |

(52) U.S. Cl.
CPC ........... *C09D 11/101* (2013.01); *B41M 5/007* (2013.01); *B41M 5/0047* (2013.01); *B41M 5/0058* (2013.01); *B41M 7/0081* (2013.01); *C09D 11/322* (2013.01); *C09D 11/38* (2013.01)

(58) Field of Classification Search
CPC ..... C09D 11/30; C09D 11/101; C09D 11/322; B41M 5/0047; B41M 5/0058; B41M 5/007; B41M 7/0081
See application file for complete search history.

(56) References Cited

U.S. PATENT DOCUMENTS

| | | |
|---|---|---|
| 2006/0014848 A1 | 1/2006 | Loccufier et al. |
| 2007/0139502 A1 | 6/2007 | Held et al. |
| 2013/0010039 A1 | 1/2013 | Kida et al. |
| 2014/0362152 A1 | 12/2014 | Fukumoto et al. |
| 2014/0368591 A1* | 12/2014 | Umebayashi ........ C09D 11/101 347/102 |

FOREIGN PATENT DOCUMENTS

| | | |
|---|---|---|
| CN | 102140155 A * | 8/2011 |
| EP | 0 239 966 A2 | 10/1987 |
| EP | 2 305 762 A1 | 4/2011 |
| EP | 2 439 244 A1 | 4/2012 |

OTHER PUBLICATIONS

Machine Translation of CN 102140155 (Year: 2011).*
Official Communication issued in International Patent Application No. PCT/EP2015/079353, dated Feb. 25, 2016.

* cited by examiner

*Primary Examiner* — Sathavaram I Reddy
(74) *Attorney, Agent, or Firm* — Leydig, Voit & Mayer, Ltd.

(57) ABSTRACT

A UV curable inkjet ink contains at least one free radical photoinitiator and at least 30 wt % of a mixture including 0 to 45 wt % of a polymerizable oligomer, at least 5 wt % of a polyfunctional propoxylated acrylate and at least 20 wt % of a monofunctional ethoxylated methacrylate according to Formula (I):

Formula (I)

$$\text{Me} - \underset{\underset{\text{O}}{\|}}{\text{C}}(=CH_2) - O - CH_2CH_2 - (O - )_n - O - R,$$

with n representing an integer of 1 to 4 and R representing an alkyl group; the weight ratio of the polyfunctional propoxylated acrylate over the monofunctional ethoxylated methacrylate is less than 1.60; and all the weight percentages wt % are based on the total weight of the UV curable inkjet ink.

14 Claims, No Drawings

UV CURABLE INKJET INKS FOR PRINTING ON GLASS

CROSS-REFERENCE TO RELATED APPLICATIONS

This application is a 371 National Stage Application of PCT/EP2015/079353, filed Dec. 11, 2015. This application claims priority to European Application No. 14198761.0, filed Dec. 18, 2014, which is incorporated by reference herein in its entirety.

BACKGROUND OF THE INVENTION

1. Field of the Invention

The present invention relates to UV curable inkjet inks and inkjet printing methods for producing images on glass surfaces.

2. Description of the Related Art

Analogue printing systems, such as offset and flexography, are being increasingly replaced by inkjet printing systems for industrial applications, due to their flexibility in use, such as the capability of variable data printing, and due to their enhanced reliability allowing their incorporation into production lines. UV curable inkjet inks are particularly preferred because high quality colour images can be printed on non-absorbing ink-receivers, such as plastic materials.

However some non-absorbing ink-receivers, like glass, pose real problems for adhesion of UV curable inkjet ink to the ink-receiving surface.

One approach to improve adhesion to a glass surface is to include in the inkjet ink finely ground glass particles, called frit, and use high firing temperatures to fuse the ink with the glass substrate. For example, WO 2007/036942 (DIP TECH LTD) discloses UV curable ink-jet inks for printing on glass and ceramic substrates comprising: (a) a liquid vehicle; (b) sub-micron particles of binding composition having a melting point below 600° C.; and (c) sub-micron particles causing an etch-like effect, the sub-micron particles are selected from metal oxide particles, high melting point frit particles, and a combination thereof, said sub-micron particles causing an etch-like effect have a melting point of at least 50° C. above the melting point of the sub-micron particles of the binding composition. The high firing temperatures result in high energy consumption for printing only a limited range of suitable colorants.

Another approach is to apply an adhesive layer by coating a usually solvent based adhesive liquid or by applying the adhesive layer as a polymeric sheet on the glass surface. The adhesive layer contains a polymer having a high affinity for glass, such as e.g. polyvinylbutyral. Such solvent based compositions have been made suitable for inkjet printing. For example, EP 2035511 A discloses ink jet inks comprising two or more organic solvents at least one of which is an alcohol, three or more binder resins comprising nitrocellulose, a thermoplastic polyurethane, and polyvinylbutyral, two or more adhesion promoters, and a soluble colorant. An example of using an inkjet printed polyvinylbutyral sheet to make decorative glass laminates is given by WO 2005/014280 (DUPONT). In the latter, again high temperatures are required in an autoclave to bind the polymeric sheet to the glass.

Yet another approach is to use specific types of monomers in the inkjet ink. For example, EP 1238024 A (3M) discloses a cationically curable inkjet ink comprising a homogeneous mixture of a compound having 2 reactive silyl groups and a compound having at least 3 reactive silyl groups; an acid generating catalyst; and a colour pigment. It was found in industrial inkjet printing systems that cationically curable inkjet inks posed problems of jetting reliability due to UV stray light. The UV-curing of the ink caused reflections of UV light, including UV light hitting the nozzle plate of an inkjet print head and resulting into failing nozzles due to clogging by cured ink in the nozzle. Unlike free radical ink where radical species have a much shorter lifetime, the cationic curable ink continues to cure once an acid species has been generated by UV light in the nozzle.

WO 02/38688 A (3M) discloses a UV curable ink containing a combination of 2-(2-ethoxyethoxy) ethyl (meth) acrylate and tetrahydrofurfuryl (meth) acrylate for improving the adhesion on different substrates such as a vinyl film.

US 2014362152 A (SEIKO EPSON) discloses an ultraviolet-curable ink composition containing 2-(2-ethoxyethoxy) ethyl acrylate and dipropylenglycol diacrylate.

US 2013010039 A (SEIKO EPSON) discloses a photocurable ink composition for ink jet recording, comprising polymerizable compounds; a photopolymerization initiator; and a colorant, wherein the polymerizable compounds include a vinyl ether group-containing (meth) acrylate.

EP 2399966 A (AGFA) discloses a free radical radiation curable inkjet ink containing a photoinitiator and polymerizable compounds including a) no more than 15 wt % of one or more monofunctional acrylates wherein the homopolymer thereof has a Tg smaller than 20° C.; and b) at least 45 wt % of a mixture of monomers consisting of b1) 10 to 45 wt % of a N-vinyl lactam and/or a vinylether acrylate; and b2) 10 to 45 wt % of an ethoxylated and/or propoxylated polyacrylate having a molecular weight of at least 450; wherein all wt % are based on the total weight of the inkjet ink.

Hence, there is still a need for UV curable inkjet inks suitable for a reliable simplified inkjet printing process on glass that does not require high temperatures, adhesive layers based on organic solvents and that can be cured by free radical polymerization.

SUMMARY OF THE INVENTION

In order to overcome the problems described above, preferred embodiments of the present invention provide a UV curable inkjet ink as defined below.

It was surprisingly found that a UV curable inkjet ink containing a specific combination of a polyfunctional propoxylated acrylate and a specific type of monofunctional ethoxylated methacrylate resulted in excellent adhesion results on unprimed glass.

Further objects of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

The term "monofunctional" means having only one polymerizable group, for example an acrylate group.

The term "polyfunctional" means having two, three or more polymerizable groups, e.g. two acrylate groups and one vinyl ether group.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

UV Curable Inkjet Inks

A UV curable inkjet ink according to the invention contains at least one free radical photoinitiator and at least 30 wt % of a mixture including 0 to 45 wt % of a polymerizable oligomer, at least 5 wt % of a polyfunctional propoxylated acrylate and at least 20 wt % of a monofunctional ethoxylated methacrylate according to Formula (I):

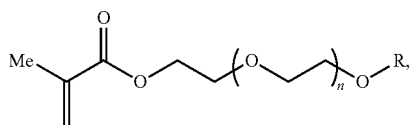

Formula (I)

with n representing an integer of 1 to 4 and R representing an alkyl group;
wherein the weight ratio of the polyfunctional propoxylated acrylate over the monofunctional ethoxylated methacrylate is less than 1.60; and
wherein all the weight percentages wt % are based on the total weight of the UV curable inkjet ink.

The UV curable inkjet ink according to the invention may be a colourless UV curable inkjet ink, but preferably the UV curable inkjet ink contains a colorant, preferably a pigment.

A colourless UV curable inkjet ink can be used as a primer on glass. The advantage of such a colourless UV curable inkjet ink is that it can be applied image-wise. Standard UV curable inkjet inks can then be jetted on the image-wise applied primer.

In a preferred embodiment of the UV curable inkjet ink, the UV curable inkjet ink contains at least 40 wt %, more preferably at least 45 wt % and most preferably at least 50 wt % of the mixture of the polyfunctional propoxylated acrylate and the monofunctional ethoxylated methacrylate, and a weight ratio of the polyfunctional propoxylated acrylate over the monofunctional ethoxylated methacrylate is less than 1.50.

In a preferred embodiment of the UV curable inkjet ink, the UV curable inkjet ink contains at least 30 wt % of a mixture including the polyfunctional propoxylated acrylate and at least 30 wt % of the monofunctional ethoxylated methacrylate.

In a preferred embodiment of the UV curable inkjet ink, the UV curable inkjet ink contains at least one free radical photoinitiator and at least 30 wt % of a mixture including at least 10 wt % of the polyfunctional propoxylated acrylate and at least 25 wt % of the monofunctional ethoxylated methacrylate.

In addition to the polyfunctional propoxylated acrylate and the monofunctional ethoxylated methacrylate, the UV curable inkjet ink preferably contains at least one polymerizable oligomer.

The UV curable inkjet inks may include other components like one or more inhibitors and/or one or more surfactants in amounts that are desired to be jettable and curable by inkjet printers.

In a preferred embodiment, the UV curable inkjet ink according to the invention contains at least 60 wt %, more preferably 70 wt %, and most preferably 75 wt % of polymerizable compounds, wherein the wt % is based on the total weight of the UV curable inkjet ink.

In a preferred embodiment, the UV curable inkjet ink according to the invention is part of a UV curable inkjet ink set, preferably a UV curable CMYK inkjet ink set. Preferably two or more UV curable inkjet inks according to the invention form a UV curable inkjet ink set, preferably a UV curable CMYK inkjet ink set.

A UV curable CMYK-inkjet ink set may also be extended with extra inks such as red, green, blue, and/or orange to further enlarge the colour gamut of the image. A UV curable inkjet ink set may also be extended by the combination of full density inkjet inks with light density inkjet inks. The combination of dark and light colour inks and/or black and grey inks improves the image quality by a lowered graininess.

The UV curable inkjet ink set may also include a varnish or primer. The UV curable inkjet ink set preferably also includes a white inkjet ink according to the present invention.

The surface tension of the UV curable inkjet inks is preferably from 20 to 50 mN/m at 25° C., more preferably from 22 to 35 mN/m at 25° C. It is preferably 20 mN/m or more from the viewpoint of printability by a second UV curable inkjet ink, and it is preferably not more than 35 mN/m from the viewpoint of the wettability.

In a preferred embodiment of the UV curable inkjet ink, the surface tension of a colourless UV curable inkjet ink used as primer is at least 2 mN/m larger than the surface tension of one or more UV curable inkjet inks containing a colorant that are jetted on the primer. This allows obtaining a good image quality for the colour inkjet inks on the primer.

The surface tension of the UV curable colourless primer and the inkjet inks is preferably from 20 to 50 mN/m at 25° C., more preferably from 22 to 35 mN/m at 25° C. It is preferably 20 mN/m or more from the viewpoint of printability by a second UV curable inkjet ink, and it is preferably not more than 35 mN/m from the viewpoint of the wettability of the substrate.

For having a good ejecting ability, the viscosity of the UV curable inkjet inks at the jetting temperature is preferably smaller than 100 mPa·s, more preferably smaller than 50 mPa·s at a shear rate of 1,000 s$^{-1}$ and at 45° C.

In a preferred embodiment, the monofunctional ethoxylated methacrylate is a compound wherein R represents a $C_1$- to $C_6$-alkyl group, a $C_1$- to $C_6$-alkenyl group or a $C_1$- to $C_6$-alkynyl group.

In a more preferred embodiment, the monofunctional ethoxylated methacrylate is a compound wherein R represents methyl, ethyl or butyl.

In a particularly preferred embodiment, the UV curable inkjet ink according to the invention includes one or more monofunctional ethoxylated methacrylates selected from those disclosed in Table 1.

TABLE 1

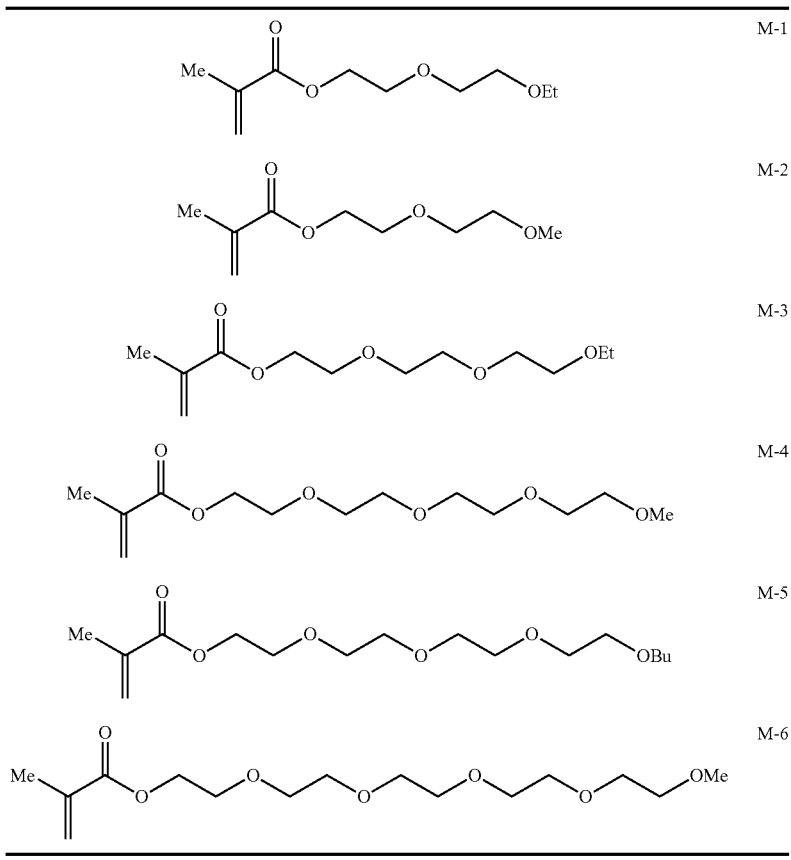

Monofunctional Ethoxylated Methacrylates

The monofunctional ethoxylated methacrylate in the UV curable inkjet ink according to the invention is a compound according to Formula (I):

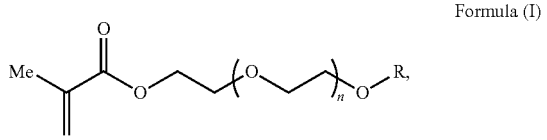

Formula (I)

with n representing an integer of 1 to 4 and R representing an alkyl group. A mixture of two or more monofunctional ethoxylated methacrylates according to Formula (I) may be used in the UV curable inkjet ink according to the invention.

In a preferred embodiment, the monofunctional ethoxylated methacrylate is a compound wherein n represents an integer of 2 or 3.

In the most preferred embodiment, the UV curable inkjet ink according to the invention includes the monomer M-1 or M-2 of Table 1 as monofunctional ethoxylated methacrylate according to Formula (I).

The UV curable inkjet ink according to the invention preferably contains the monofunctional ethoxylated methacrylate according to Formula (I) in an amount of 20 to 70 wt %, more preferably in an amount of 25 to 60 wt %, and most preferably in an amount of 30 to 50 wt %, wherein all the weight percentages wt % are based on the total weight of the UV curable inkjet ink.

Polyfunctional Propoxylated Acrylates

The UV curable inkjet ink according to the invention contains at least one propoxylated polyfunctional acrylate, but a mixture of two or more propoxylated polyfunctional acrylates may also be used.

Preferred examples of propoxylated polyfunctional acrylates are dipropylene glycol diacrylate, tripropylene glycol diacrylate, propoxylated trimethylol propane triacrylate, propoxylated glycerol triacrylate, propoxylated pentaerythritol triacrylate, propoxylated pentaerythritol tetraacrylate, propoxylated bisphenol A diacrylate, propoxylated 2,2-dimethyl-1,3-propane diol (neopentyl glycol) diacrylate and diacrylated polypropylene oxide.

Preferred propoxylated polyfunctional acrylates are given by Table 2, represented by one of their isomers and a specific degree of propoxylation. In some cases, the degree of propoxylation, i.e. the number n of propoxyl units in a compound is not a single number but an average of a mixture of such compounds having different values for n. For example, PP-5 encompasses a compound with n=11 as well as a compound with n=13. In a preferred embodiment, the compound PP-5 includes a compound having a number n of 3 to 15 and the compound PP-8 includes a compound having a number n of 2 to 10.

TABLE 2

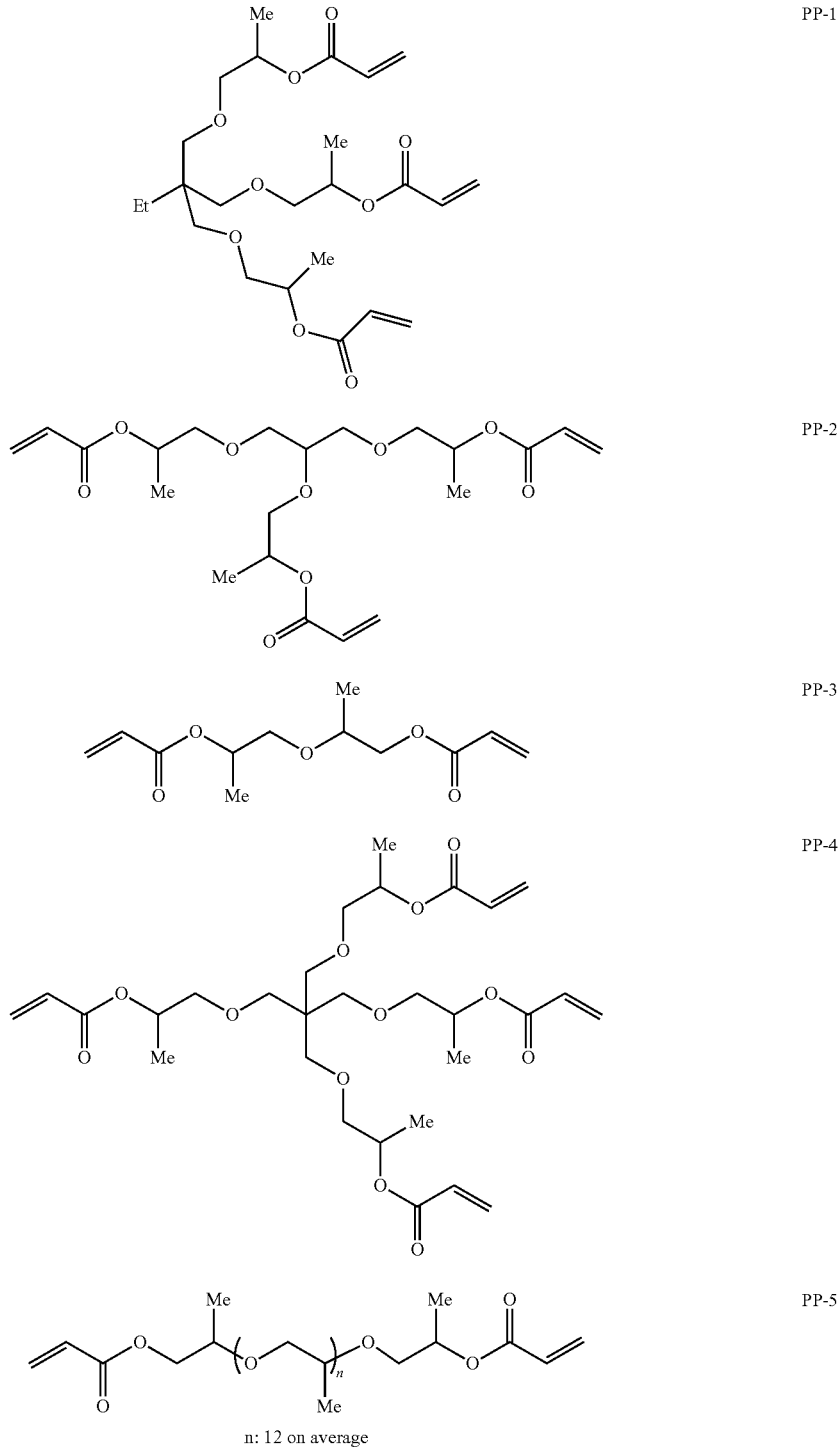

TABLE 2-continued

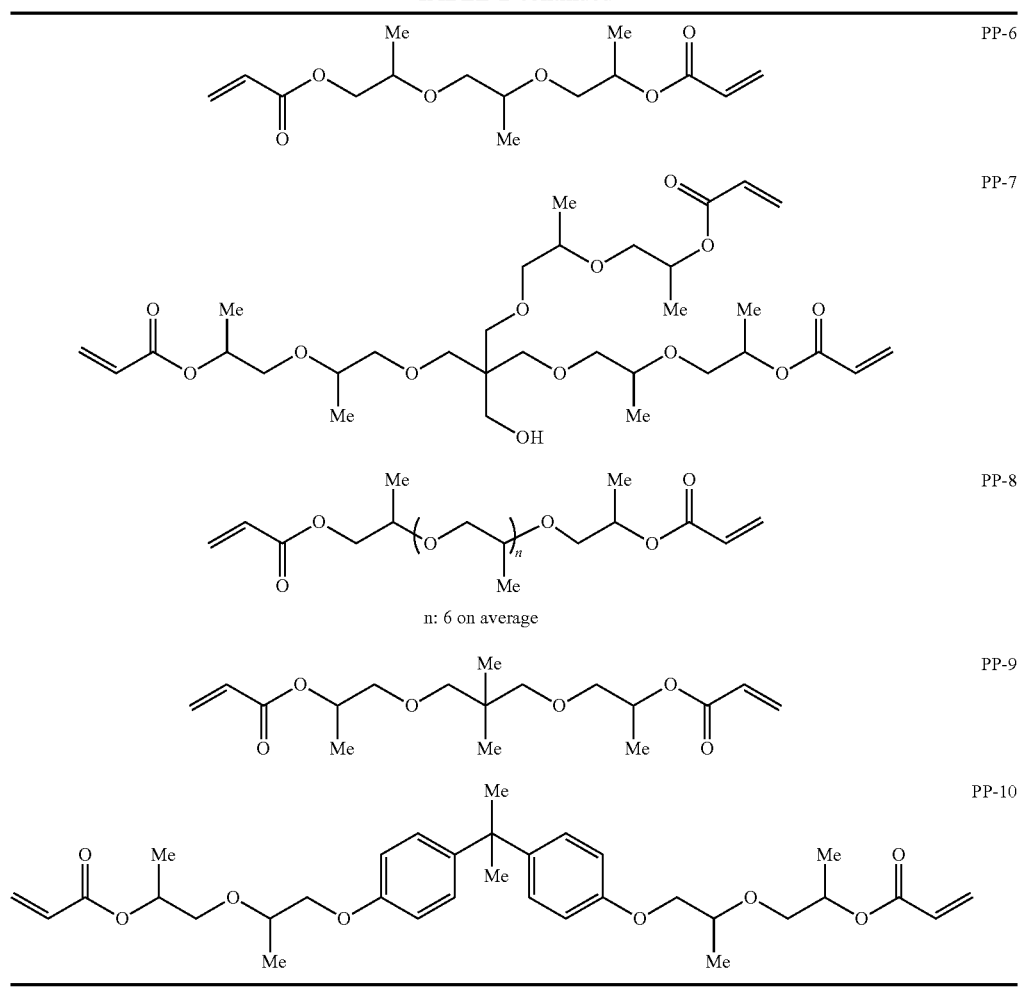

In a particular preferred embodiment of the UV curable inkjet ink according to the invention, the propoxylated polyfunctional acrylate is selected from the group consisting of dipropyleneglycol diacrylate and propoxylated neopentyl glycol diacrylate.

The UV curable inkjet ink according to the invention preferably contains the propoxylated polyfunctional acrylate in an amount of 5 to 50 wt %, more preferably in an amount of 10 to 40 wt %, wherein all the weight percentages wt % are based on the total weight of the UV curable inkjet ink.

Polymerizable Oligomers

The UV curable inkjet ink preferably contains a polymerizable oligomer in an amount of 0 to 45 wt %, more preferably in an amount of 5 to 35 wt %, and most preferably in an amount of 8 to 25 wt %, wherein the wt % is based on the total weight of the UV curable inkjet ink.

A mixture of two or more polymerizable oligomers may be used in the UV curable inkjet ink according to the invention.

In a preferred embodiment of the UV curable inkjet ink, the polymerizable oligomer is a urethane acrylate. The polymerizable oligomer may be an aliphatic acrylate or an aromatic urethane acrylate, but is preferably an aliphatic urethane acrylate.

Preferred urethane acrylate oligomers are the CN9xx-grades from ARKEMA, such as preferably CN963B80, CN9001, CN9002, CN976, CN9900, CN965, and CN966H90.

In a preferred embodiment of the UV curable inkjet ink, the polymerizable oligomer is an epoxy acrylate, more preferably an aromatic epoxy acrylate.

Preferred epoxy acrylate oligomers are the CN1xx-grades from ARKEMA, such as preferably CN UVE 151, CN113D70, CN131B and CN132.

Other Polymerizable Compounds

In addition to the one or more monofunctional ethoxylated methacrylate according to Formula (I), the one or more propoxylated polyfunctional acrylates and the one or more polymerizable oligomers, one or more other polymerizable compounds may be used in the UV curable inkjet ink according to the invention, but preferably the polymerizable composition consists for 75 wt %, preferably 80 wt % and most preferably 100 wt % out of one or more monofunctional ethoxylated methacrylate according to Formula (I), one or more propoxylated polyfunctional acrylates and one or more polymerizable oligomers, wherein the wt % is based on the total weight of the polymerizable composition.

Any monomer and oligomer capable of free radical polymerization may be used as polymerizable compound. The monomers and oligomers may have different degrees of polymerizable functionality, and a mixture including combinations of mono-, di-, tri- and higher polymerizable functionality monomers may be used. The viscosity of the UV curable inkjet ink can be adjusted by varying the ratio between the monomers.

Particularly preferred for use as a radiation curable compound in the radiation curable inkjet ink are monofunctional and/or polyfunctional (meth)acrylate monomers, oligomers or prepolymers, such as isoamyl (meth)acrylate, stearyl (meth)acrylate, lauryl (meth)acrylate, octyl (meth)acrylate, decyl (meth)acrylate, isoamylstyl (meth)acrylate, isostearyl (meth)acrylate, 2-ethylhexyl-diglycol (meth)acrylate, 2-hydroxybutyl (meth) acrylate, 2-acryloyloxyethylhexahydrophthalic acid, butoxyethyl (meth)acrylate, ethoxydiethylene glycol acrylate, methoxydiethylene glycol acrylate, methoxypolyethylene glycol acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth) acrylate, 2-hydroxy-3-phenoxypropyl (meth)acrylate, vinyl ether (meth)acrylate, 2-acryloyloxyethylsuccinic acid, 2-acryloyxyethylphthalic acid, 2-acryloxyethyl-2-hydroxyethyl-phthalic acid, lactone modified flexible (meth)acrylate, and t-butylcyclohexyl (meth)acrylate, triethylene glycol di(meth)acrylate, tetraethylene glycol di(meth)acrylate, polyethylene glycol di(meth)acrylate, dipropylene glycol di(meth)acrylate, tripropylene glycol dimethacrylate, polypropylene glycol dimethacrylate, 1,4-butanediol di(meth)acrylate, 1,6-hexanediol di(meth)acrylate, 1,9-nonanediol di(meth)acrylate, neopentyl glycol diacrylate, dimethyloltricyclodecane diacrylate, bisphenol A EO (ethylene oxide) adduct diacrylate, bisphenol A PO (propylene oxide) adduct dimethacrylate, hydroxypivalate neopentyl glycol diacrylate, propoxylated neopentyl glycol dimethacrylate, alkoxylated dimethyloltricyclodecane di(meth)acrylate and polytetramethylene glycol di(meth)acrylate, trimethylolpropane tri(meth)acrylate, EO modified trimethylolpropane tri(meth)acrylate, tri (propylene glycol) trimethacrylate, caprolactone modified trimethylolpropane tri(meth)acrylate, pentaerythritol tri(meth)acrylate, pentaerithritol tetra(meth)acrylate, pentaerythritolethoxy tetra(meth)acrylate, dipentaerythritol hexa(meth)acrylate, ditrimethylolpropane tetra(meth)acrylate, glycerinpropoxy trimethacrylate, and caprolactam modified dipentaerythritol hexa(meth)acrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and ethoxylated cyclohexanone dimethanol diacrylate.

Other suitable difunctional acrylates include ethoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include ethoxylated glycerine triacrylate and ethoxylated trimethylolpropane triacrylate.

Other higher functional acrylates include di-trimethylolpropane tetraacrylate, dipentaerythritol pentaacrylate, ethoxylated pentaeryhtitol tetraacrylate, methoxylated glycol acrylates and acrylate esters.

Furthermore, methoxypolyethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity.

Furthermore, the UV curable inkjet inks may also contain polyester acrylates oligomers and straight-chained acrylic oligomers.

Furthermore, the UV curable inkjet inks may also contain N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

In a preferred embodiment, the UV curable colourless primer and/or colour inkjet ink contains a vinylether acrylate. Preferred vinylether acrylates are those disclosed in U.S. Pat. No. 6,310,115 (AGFA). A particularly preferred compound is 2-(2-vinyloxyethoxy)ethyl acrylate. Other suitable vinylether acrylates are those disclosed in columns 3 and 4 of U.S. Pat. No. 6,767,980 (NIPPON SHOKUBAI).

In a preferred embodiment, the UV curable inkjet ink includes at least one monomer selected from the group consisting of 2-(2-vinyloxyethoxy) ethyl acrylate, N-vinyl caprolactam, phenoxyethyl acrylate, isobornyl acrylate ethoxylated trimethylolpropane triacrylate and cyclic trimethylolpropane formal acrylate.

Photoinitiating System

The UV curable inkjet ink contains at least one free radical photoinitiator, but may contain a photoinitiating system including a plurality of photoinitiators and/or co-initiators.

A free radical photoinitiator is a chemical compound that initiates polymerization of monomers and oligomers when exposed to actinic radiation by the formation of a free radical.

Two types of free radical photoinitiators can be distinguished and used in the UV curable inkjet ink of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable ink may additionally contain co-initiators. Preferred examples of co-initiators can be categorized in three groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The most preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4, 6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment, the photoinitiator is selected from the group consisting of non-polymeric multifunctional photoinitiators, oligomeric or polymeric photoinitiators and polymerizable photoinitiators. Such a diffusion hindered photoinitiator exhibits a much lower mobility in a cured layer of the UV curable inkjet inks than a low molecular weight monofunctional photoinitiator, such as benzophenone. Including diffusion hindered photoinitiators, and also diffusion hindered co-initiators do not only have a safety advantage for the operator of the inkjet printer, but are also environmentally friendly as these compounds cannot be leached out by e.g. acid rain.

Most preferably the diffusion hindered photoinitiator is a polymerizable photoinitiator, preferably having at least one acrylate group. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

In a preferred embodiment, the UV curable colourless primer includes no thioxanthone type photoinitiator. UV curable colourless primers including thioxanthone type photoinitiators generally exhibit strong photoyellowing.

A preferred amount of photoinitiator is 0-50 wt %, more preferably 0.1-20 wt %, and most preferably 0.3-15 wt % of the total weight of the curable pigment dispersion or ink.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture.

Preferred hyperbranched polymeric co-initiators are those disclosed in US 2006014848 (AGFA) incorporated herein as a specific reference.

The UV curable ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from ALLNEX.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the UV curable inkjet ink.

Colorants

The colorants used in the UV curable inkjet inks can be a combination of pigments and dyes, but preferably consist of colour pigments. Organic and/or inorganic pigments may be used.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to of WO 2008/074548 (AGFA GRAPHICS).

In a preferred embodiment, the UV curable inkjet inks is a UV curable yellow inkjet ink including a pigment selected from the group consisting of C.I Pigment Yellow 150, C.I Pigment Yellow 151, C.I Pigment Yellow 155 and C.I Pigment Yellow 180.

A preferred pigment for the cyan inkjet ink is C.I. Pigment Blue 15:4.

A preferred pigment for the magenta inkjet ink is preferably selected from the group consisting of diketopyrrolopyrrole pigments, quinacridone pigments and mixed crystals thereof.

Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Preferred mixed crystals contain at least 70% of unsubstituted quinacridone. A commercially available example is Cinquasia™ Magenta RT-355-D from BASF.

Also mixtures of pigments may be used in the UV curable colour inkjet inks. A UV curable neutral black inkjet ink is preferred and can be obtained, for example, by mixing a black pigment and a cyan pigment and/or magenta pigment into the ink.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness.

However for white pigment inkjet inks, the numeric average particle diameter of the white pigment is preferably from 150 to 500 nm, more preferably from 200 to 400 nm, and most preferably from 250 to 300 nm. Sufficient hiding power cannot be obtained when the average diameter is less than 150 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA).

The pigments are present in the range of 0.01 to 15%, more preferably in the range of 0.05 to 10% by weight and most preferably in the range of 0.1 to 5% by weight, each based on the total weight of the inkjet ink. For white pigmented ink, the white pigment is preferably present in an amount of 3% to 30% by weight of the inkjet ink, and more preferably 5% to 25%. An amount of less than 3% by weight cannot achieve sufficient covering power and usually exhibits very poor storage stability and ejection property.

Polymeric Dispersants

If the colorant in the UV curable inkjet ink is a pigment, then the UV curable inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA).

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MUNZING CHEMIE;
ETHACRYL™ dispersants from LYONDELL;
GANEX™ dispersants from ISP;
DISPEX™ and EFKA™ dispersants from BASF;
DISPONER™ dispersants from DEUCHEM; and
JONCRYL™ dispersants from JOHNSON POLYMER.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA), EP 1790696 A (AGFA), WO 2007/060255 (AGFA) and EP 1790695 A (AGFA).

In dispersing C.I. Pigment Blue 15:3, the use of a sulfonated Cu-phthalocyanine dispersion synergist, e.g. Solsperse™ 5000 from NOVEON is preferred. Suitable dispersion synergists for yellow inkjet inks include those disclosed in EP 1790697 A (AGFA).

Surfactants

The UV curable inkjet ink inkjet ink must meet stringent performance criteria in order to be adequately jettable with high precision and reliability during an extended period of time. In order to achieve this, the surface tension of the ink is reduced by the addition of one or more surfactants. In the case of UV curable inkjet inks, however, the surface tension of the inkjet ink is not only determined by the amount and type of surfactant, but also by the polymerizable compounds, the polymeric dispersants and other additives in the ink composition.

The surfactant can be anionic, cationic, non-ionic, or zwitter-ionic and is usually added in a total quantity less than 1 wt % based on the total weight of the UV curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preparation of Inkjet Inks

The preparation of pigmented UV curable inkjet inks is well-known to the skilled person. Suitable methods of preparation are disclosed in paragraphs [0076] to [0085] of WO 2011/069943 (AGFA).

A preferred method of manufacturing a UV curable inkjet ink according to the invention includes at least the steps of: a) making a polymerizable composition with one or more monomers or oligomers; and b) adding at least one free radical photoinitiator to the polymerizable composition; wherein the UV curable inkjet ink contains at least 30 wt % of a mixture including at least 5 wt % of a polyfunctional propoxylated acrylate and at least 20 wt % of a monofunctional ethoxylated methacrylate according to Formula (I):

Formula (I)

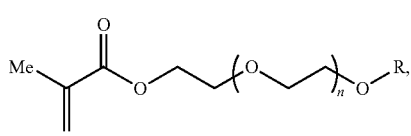

with n representing an integer of 1 to 4 and R representing an alkyl group, a alkenyl group or a alkynyl group; wherein the weight ratio of the polyfunctional propoxylated acrylate over the monofunctional ethoxylated methacrylate is less than 1.60; and wherein all the weight percentages wt % are based on the total weight of the UV curable inkjet ink.

UV Curable Inkjet Printing Methods

A UV curable inkjet printing method according to the invention comprises the steps of: a) jetting one or more UV curable inkjet inks according to the invention on a substrate; and b) at least partially UV curing the one or more UV curable inkjet inks jetted on the substrate.

The UV curable inkjet printing method is especially suitable for jetting on a substrate which has a glass surface, wherein excellent adhesion of the ink to the glass surface is obtained. However, it was also found that good adhesion could be obtained on polymeric surfaces, such as polyethylene terephthalate (PET) and other types of polyesters, and especially on metallic surfaces, such as aluminium surfaces, copper surfaces and iron based surfaces like plain steel, stainless steel and galvanized steel.

In a preferred embodiment, the UV curable inkjet printing method of the invention is incorporated in a production line for making decorative glass articles. The UV curable inkjet printing method is preferably part of a method for making decorative glass articles, wherein a decorative layer is printed on a glass sheet.

For outdoor purposes, the decorative layer on the glass sheet is preferably positioned between the glass sheet and a second rigid sheet such as glass or polycarbonate. The second rigid sheet is preferably also a glass sheet. The second rigid sheet can be laminated on the decorative layer on the glass sheet using an interlayer.

The interlayer can be a solid thermoplastic polymeric sheet, such as a polyvinylbutyral sheet, or a curable liquid adhesive resin composition. These techniques for laminating two glass sheets are well-known in the art and exemplified in US 2008206504 (HAYES ET AL), WO 2005/085371 (DUPONT), WO 2006/050536 (DUPONT) and WO 2014/048589 (VITRAPRINT).

Preferred thermoplastic polymeric sheets are selected from the group consisting of poly(vinyl acetal) sheets and poly(ethylene-co-vinyl acetate) sheets. Particularly preferred for the purposes of the present invention are poly (vinyl butyral) sheets. Commercially available poly(vinyl butyral) sheets are, for example, available from DuPont under the tradename of Butacite™.

The curable liquid adhesive resin composition is preferably liquid at 25° C. and has a viscosity at 25° C. of preferably 1 to 1,000 mPa·s, more preferably of less than 500 mPa·s, and most preferably no more than 250 mPa·s.

The curable liquid adhesive resin composition is preferably selected from a one or multiple component acrylate-type, polyester-type, epoxy-type, polyurethane-type, adhesive resin and/or combinations thereof.

In a particularly preferred embodiment, the curable liquid adhesive resin composition is a UV curable urethane acrylate liquid adhesive resin, preferably having a viscosity of no more than 250 mPa·s, more preferably no more than 5 to 200 mPa·s.

A method for making decorative glass articles includes the UV curable inkjet printing method according to the invention for producing a decorative layer on a glass sheet.

In a preferred embodiment, the method for making decorative glass articles includes the steps of: a) UV inkjet printing an image with one or more UV curable inkjet inks according to the invention on a first glass sheet; b) applying a double sided tape on all four edges of the first glass sheet on the side carrying the image; c) applying a second glass sheet onto the double sided tape well aligned with the first glass sheet;

d) applying a curable liquid adhesive resin composition between the first and second glass sheets; and e) curing the curable liquid adhesive resin composition until a solid adhesive layer is obtained.

The double sided tape preferably has a thickness of 0.4 to 3 mm. The thickness of the tape defines the space between the glass sheets. Sealing of the non-closed areas between the tapes can be done by means of a cross-over of the tape, by non-acidic silicone or with a hot melt glue or adhesive.

The curable liquid adhesive resin composition is pumped or poured between the two glass sheets in an area which has not yet been sealed. After the curable liquid adhesive resin composition has been applied between the first and second glass sheets, if necessary, air is evacuated. This can be achieved by laying the assembly of the first and second glass sheets horizontal and allowing the curable liquid adhesive resin composition to spread and fill the internal space between the first and second glass sheets. Final trapped air and bubbles are removable, for example, by using a syringe.

The liner/backing of the double sided tape is preferably not fully removed at the same time for the four edges. Preferably, from a part of the tape the liner/backing is removed and is firmly pressed down so as to seal the contact between the glass sheets and the tape. The curable liquid adhesive resin composition is pumped or poured between the glass sheets via an open side between the glass sheets which has not been sealed yet. After the curable liquid adhesive resin composition has been applied in the internal space between the two glass sheets, the air is evacuated by laying the formed multi-layered decorative panel horizontal and allowing the curable liquid adhesive resin composition to spread and fill the internal space. At the same time, the remaining liner/backing of the tape is removed and the internal space is sealed. Final trapped air and bubbles are removable using e.g. a syringe.

Inkjet Printing Devices

The UV curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

Preferred piezoelectric print heads are so-called though flow piezoelectric print heads available from sources such as XAAR, RICOH and Toshiba TEC. In through flow print heads, the ink is recirculated in the inkjet printing device via an inlet and outlet of the print head, whereby sedimentation of dense pigment particles is largely prevented.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Another preferred print head for jetting droplets having much higher volumes, typically 1 to 200 nL, is a so-called valvejet printhead. A valvejet printhead is also called coil package or micro valves or a dispensing module of micro valves. The droplet forming means in a valvejet printhead controls a micro valve in the valvejet print head by actuating electromagnetically to close or to open the micro valve so that the liquid flows through the liquid channel. Valvejet printheads preferably have a maximum dispensing frequency up to 3000 Hz. The way to incorporate valvejet printheads into an inkjet printing device is well-known to the skilled person. For example, WO 2005/014280 (DUPONT) discloses a valvejet printer including a solenoid coil and a plunger rod having a magnetically susceptible shank. Suitable commercial valvejet print heads are HSV400 and HSV800 all from ZIMMER, Printos™ P16 from VideoJet and the coil packages of micro valve SMLD 300's from FRITZ GYGER™. A nozzle plate of a valvejet print head is often called a faceplate and is preferably made from stainless steel.

UV Curing Devices

The UV curable inkjet ink is cured by exposure to ultraviolet radiation. The UV curing means may be arranged in combination with the print head of the inkjet printer, travelling therewith so that the UV curable inkjet ink is exposed to curing radiation very shortly after been jetted.

In such an arrangement it can be difficult to provide a small enough radiation source connected to and travelling with the print head, such as LED. Therefore, a static fixed radiation source may be employed, e.g. a source of curing UV-light, connected to the radiation source by means of flexible radiation conductive means such as a fibre optic bundle or an internally reflective flexible tube. Alternatively, the actinic radiation may be supplied from a fixed source to the radiation head by an arrangement of mirrors including a mirror upon the radiation head. However preferably UV LEDs are connected to and travelling with the print head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the UV curable inkjet ink is cured by UV LEDs only. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink pattern using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as ALDRICH CHEMICAL Co. (Belgium) and ACROS (Belgium) unless otherwise specified.

TiO2 is an abbreviation used for Ti-Pure R-706, a titanium dioxide pigment from DuPont.

PB7 is an abbreviation used for Special Black™ 550, which is a carbon black from EVONIK DEGUSSA.

E7701 is a polyacrylate dispersion agent available as Efka™ 7701 from BASF.

INHIB is a mixture forming a polymerization inhibitor having a composition according to Table 9.

TABLE 9

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

BHT is butylhydroxytoluene from Aldrich.

THFA is tetrahydrofurfuryl acrylate available as Sartomer™ 285 from Arkema

LTM is a liquid photo initiator blend available as Genocure LTM from Rahn

MBF is methyl benzoylformate, a photo initiator available as Genocure MBF from Rahn BYK™ UV3510 is a polyether thermomodified polydimethylsiloxane, a surfactant from BYK Chemie CN151 is an epoxy acrylate oligomer CN UVE 151 from Arkema CN976 is an aromatic difunctional urethane acrylate oligomer from Arkema CN9001 is an aliphatic urethane acrylate oligomer from Arkema EOEOEMA is ethoxyethoxy ethyl methacrylate from ABCR EOEOEA is ethoxyethoxy ethylacrylate available as Sartomer™ SR256 from Arkema SR9003 is propoxylated neopentyl glycol diacrylate, available from Arkema SR834 is tricyclodecanedimethanol dimethacrylate available from Arkema AHPMA is 3-(acryloyloxy)-2-hydroxypropyl methacrylate from Aldrich EBDA is ethoxylated bisphenol A diacrylate E4858 is a poly urethane substituted acrylate oligomer available as Ebecryl 4858 from Allnex FST410 is a poly urethane substituted methacrylate oligomer (having the same backbone structure as E4858) from AZ Electronics Materials THICTA is tris-(2-hydroxy ethyl) isocyanurate triacrylate available as Sartomer SR368 from Arkema TMPTA is trimethylolpropane triacrylate available as SR350 from ARKEMA.

PETA is penta erythritol tetra acrylate available as Sartomer 295 from Arkema.

SR259 is polyethylene glycol (MW200) diacrylate available as Sartomer™ SR259 from Arkema.

NPGDA is neopentyl glycol diacrylate available as Sartomer SR247 from Arkema

HDEODA is 1,6-hexanediol (2 EO) diacrylate available as Photomer 4361 from IGM Resins IBOA is isobornyl acrylate available as Sartomer™ SR506D from Arkema IBOMA is isobornyl methacrylate available as Photomer 2012 from IGM Resins PEA is phenoxyethyl acrylate available as Sartomer™ SR339C from Arkema.

PEMA is phenoxyethyl methacrylate available as SR340 from Arkema

SR348C is ethoxylated (3) bisphenol A dimethacrylate from Arkema

SR411 is ethoxylated (4) phenyl methacrylate from Arkema

SR480 is ethoxylated (10) bisphenol A dimethacrylate from Arkema

SR540 is ethoxylated (4) bisphenol A dimethacrylate from Arkema

DPGDA is dipropylene glycol diacrylate available as SR508 from Arkema

THFMA is tetrahydrofurfuryl methacrylate available as SR203 from Arkema

AAEMA is 2-aceto acetoxyethyl methacrylate from Aldrich

MAES is mono-2-(methacryloyloxy)ethyl succinate from Aldrich

DHPMA is 2,3-dihydroxy propyl methacrylate from NOF Corporation

HBMA is hydroxybutyl methacrylate from Aldrich

DMA is n-decyl methacrylate from ABCR

Measurement Methods

1. Average Particle Size

The average particle size of pigments in a pigment dispersion was determined with photon correlation spectroscopy at a wavelength of 633 nm with a 4 mW HeNe laser on a diluted sample of the pigment dispersion. The particle size analyzer used was a Malvern™ nano-S from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements of 6 runs of 20 seconds.

2. Adhesion on Glass

For testing adhesion the cross hatch cutter set Elcometer 1542 was used. The distance between the applied scratches is 1 mm. A 5 cm long strip of Tesatape™ 4104 PVC tape was pressed on to the cross cut inkjet ink. The tape was pressed four times with the thumb before removing it in one sharp pull. The adhesion was then evaluated in accordance with the evaluation values described in Table 2.

TABLE 2

| Evaluation value | Observation |
|---|---|
| 0 | Nothing removed, perfect adhesion. |
| 1 | Detachment of only very small parts of the inkjet ink coating, almost perfect adhesion. |
| 2 | Minor parts of the inkjet ink coating was removed by the tape, good adhesion |
| 3 | Parts of the inkjet ink coating were removed by the tape, poor adhesion. |
| 4 | Most of the inkjet ink coating was removed by the tape, poor adhesion. |
| 5 | The inkjet ink was completely removed from the substrate by the tape, no adhesion. |

3. Viscosity

The viscosity of the UV curable compositions was measured at 45° C. and at a shear rate of 1,000 s$^{-1}$ using a Rotovisco™ RV1 viscometer from HAAKE.

4. Surface Tension

The static surface tension of the UV curable inks was measured with a KRÜSS tensiometer K9 from KRÜSS GmbH, Germany at 25° C. after 60 seconds.

Preparation of Concentrated Pigment Dispersions

Concentrated White Pigment Dispersion CPW

A concentrated white pigment dispersion CPW was prepared having a composition according to Table 3.

TABLE 3

| wt % of: | CPW |
|---|---|
| TiO2 | 50.0 |
| E7701 | 10.0 |
| INHIB | 1.0 |
| THFA | 39.0 |

CPW was made by mixing THFA, the white pigment TiO2, the inhibitor INHIB and a 30% solution of the polymeric dispersant EFKA7701 in THFA for 30 minutes according to Table 3 in a vessel equipped with a DISPERLUX™ disperser (from DISPERLUX S.A.R.L., Luxembourg). This mixture was subsequently milled in a DYNO™-MILL ECM from the company WAB Willy A. Bachofen (Switzerland) using 0.40 mm yttrium-stabilized zirconium oxide-beads. The bead mill was filled for 52% with the grinding beads and operated in recirculation mode at a tip speed of 12 m/s. The milling chamber was water-cooled during the operation. After milling, the concentrated pigment dispersion was discharged over a 1 µm filter into a vessel. The average particle size was 313 nm.

Concentrated Black Pigment Dispersion CPK

A dispersion was made by mixing the components according to Table 4 for 30 minutes using a DISPERLUX™ disperser from DISPERLUX S.A.R.L., Luxembourg. The dispersion was then milled using a Netzsch Mini_Zeta mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 µm filter into a vessel. The milling chamber was water-cooled during the operation. The resulting concentrated pigment dispersion CPK had an average particle size of 137 nm.

TABLE 4

| Component | wt % |
|---|---|
| PB7 | 15.00 |
| E7701 | 15.00 |
| INHIB | 1.00 |
| THFA | 69.00 |

Preparation of UV Curable Inkjet Inks

The comparative UV curable inkjet inks COMP-1 to COMP-69 and the inventive UV curable inkjet inks INV-1 to INV-13 were prepared according to Table 5 and Table 6 using the above prepared concentrated pigment dispersion CPW and CPK where necessary. The weight percentages (wt %) were based on the total weight of the UV curable inkjet ink.

TABLE 5

| | Inkjet Ink | | |
|---|---|---|---|
| Component | White | Black | Colourless |
| Monofunctional monomer | See Table 6 | See Table 6 | See Table 6 |
| Polyfunctional monomer | See Table 6 | See Table 6 | See Table 6 |
| Polymerizable oligomer | See Table 6 | See Table 6 | See Table 6 |
| LTM | 7 wt % | 7 wt % | 7 wt % |
| MBF | 3 wt % | 3 wt % | 3 wt % |
| BYK ™ UV3510 | 1 wt % | 1 wt % | 1 wt % |
| TiO2 | 10 wt % | — | — |
| PB7 | — | 3 wt % | — |
| E7701 | 2 wt % | 3 wt % | — |
| THFA | balance to 100 wt % | balance to 100 wt % | balance to 100 wt % |

The types and amounts of monofunctional monomer, polyfunctional monomer and polymerizable oligomer used in the UV curable colourless, white and black inkjet inks of Table 5 is shown in Table 6.

TABLE 6

| INK | COL-OR-ANT | Monofunctional Monomer | | Polyfunctional Monomer | | Polymerizable Oligomer | |
|---|---|---|---|---|---|---|---|
| | | Type | wt % | Type | wt % | Type | wt % |
| COMP-1 | T$_i$O2 | — | — | SR9003 | 25 | CN151 | 45 |
| COMP-2 | T$_i$O2 | — | — | SR9003 | 40 | CN151 | 30 |
| COMP-3 | T$_i$O2 | — | — | SR9003 | 55 | CN151 | 15 |
| COMP-4 | PB7 | EOEOEA | 20 | SR9003 | 30 | CN151 | 20 |
| COMP-5 | PB7 | EOEOEA | 20 | SR9003 | 30 | CN976 | 20 |
| COMP-6 | PB7 | EOEOEA | 20 | SR9003 | 30 | CN9001 | 20 |
| COMP-7 | T$_i$O2 | EOEOEA | 20 | SR9003 | 30 | CN9001 | 20 |
| COMP-8 | T$_i$O2 | EOEOEA | 20 | SR9003 | 30 | CN151 | 20 |
| COMP-9 | T$_i$O2 | EOEOEA | 20 | SR9003 | 30 | CN976 | 20 |
| COMP-10 | T$_i$O2 | EOEOEA | 25 | SR9003 | 40 | CN151 | 5 |
| COMP-11 | T$_i$O2 | EOEOEA | 26 | SR9003 | 40 | — | — |
| COMP-12 | T$_i$O2 | EOEOEA | 30 | SR9003 | 35 | CN151 | 5 |
| COMP-13 | T$_i$O2 | EOEOEA | 30 | SR9003 | 40 | — | — |
| COMP-14 | T$_i$O2 | EOEOEA | 30 | SR834 | 30 | CN151 | 5 |
| COMP-15 | T$_i$O2 | EOEOEA | 30 | AHPMA | 30 | CN151 | 5 |
| COMP-16 | T$_i$O2 | EOEOEA | 30 | SR834 | 30 | — | — |
| COMP-17 | T$_i$O2 | EOEOEA | 30 | AHPMA | 30 | — | — |
| COMP-18 | T$_i$O2 | EOEOEMA | 5 | SR9003 | 25 | CN151 | 40 |
| COMP-19 | T$_i$O2 | EOEOEMA | 5 | SR9003 | 40 | CN151 | 25 |

TABLE 6-continued

| INK | COLORANT | Monofunctional Monomer Type | wt % | Polyfunctional Monomer Type | wt % | Polymerizable Oligomer Type | wt % |
|---|---|---|---|---|---|---|---|
| COMP-20 | T/O2 | EOEOEMA | 5 | SR9003 | 55 | CN151 | 10 |
| COMP-21 | T/O2 | EOEOEMA | 10 | SR9003 | 20 | CN151 | 40 |
| COMP-22 | T/O2 | EOEOEMA | 10 | SR9003 | 35 | CN151 | 25 |
| COMP-23 | T/O2 | EOEOEMA | 10 | SR9003 | 55 | CN151 | 5 |
| COMP-24 | T/O2 | EOEOEMA | 15 | SR9003 | 10 | CN151 | 45 |
| COMP-25 | T/O2 | EOEOEMA | 15 | SR9003 | 30 | CN151 | 25 |
| COMP-26 | T/O2 | EOEOEMA | 15 | SR9003 | 50 | CN151 | 5 |
| COMP-27 | T/O2 | EOEOEMA | 20 | EBDA | 30 | CN151 | 20 |
| COMP-28 | T/O2 | EOEOEMA | 20 | E4858 | 30 | CN151 | 20 |
| COMP-29 | T/O2 | EOEOEMA | 20 | FST 510 | 30 | CN151 | 20 |
| COMP-30 | T/O2 | EOEOEMA | 20 | THICTA | 30 | CN151 | 20 |
| COMP-31 | T/O2 | EOEOEMA | 20 | SR9003 | 5 | CN151 | 45 |
| COMP-32 | T/O2 | EOEOEMA | 20 | SR9003 | 45 | CN151 | 5 |
| COMP-33 | T/O2 | EOEOEMA | 25 | SR9003 | 40 | CN151 | 5 |
| COMP-34 | T/O2 | EOEOEMA | 25 | SR9003 | 45 | — | — |
| COMP-35 | T/O2 | EOEOEMA | 30 | TMPTA | 35 | CN151 | 5 |
| COMP-36 | T/O2 | EOEOEMA | 30 | PETA | 35 | CN151 | 5 |
| COMP-37 | T/O2 | EOEOEMA | 30 | SR259 | 35 | CN151 | 5 |
| COMP-38 | T/O2 | EOEOEMA | 30 | NPGDA | 30 | CN151 | 20 |
| COMP-39 | T/O2 | EOEOEMA | 30 | HDEODA | 20 | CN151 | 20 |
| COMP-40 | T/O2 | IBOA | 20 | SR9003 | 30 | CN151 | 20 |
| COMP-41 | T/O2 | IBOA | 25 | SR9003 | 40 | CN151 | 5 |
| COMP-42 | T/O2 | IBOA | 30 | SR9003 | 35 | CN151 | 5 |
| COMP-43 | T/O2 | IBOA | 30 | SR9003 | 40 | — | — |
| COMP-44 | T/O2 | IBOMA | 20 | SR9003 | 30 | CN151 | 20 |
| COMP-45 | T/O2 | IBOMA | 25 | SR9003 | 40 | CN151 | 5 |
| COMP-46 | T/O2 | PEA | 20 | SR9003 | 30 | CN151 | 20 |
| COMP-47 | T/O2 | PEA | 25 | SR9003 | 40 | CN151 | 5 |
| COMP-48 | T/O2 | PEA | 30 | SR9003 | 35 | CN151 | 5 |
| COMP-49 | T/O2 | PEA | 30 | SR9003 | 40 | — | — |
| COMP-50 | T/O2 | PEMA | 20 | SR9003 | 30 | CN151 | 20 |
| COMP-51 | T/O2 | PEMA | 25 | SR9003 | 40 | CN151 | 5 |
| COMP-52 | T/O2 | SR348C | 19 | SR9003 | 30 | CN151 | 20 |
| COMP-53 | T/O2 | SR411 | 19 | SR9003 | 30 | CN151 | 20 |
| COMP-54 | T/O2 | SR480 | 19 | SR9003 | 30 | CN151 | 20 |
| COMP-55 | T/O2 | SR540 | 19 | SR9003 | 30 | CN151 | 20 |
| COMP-56 | T/O2 | THFA | 20 | SR9003 | 30 | CN151 | 20 |
| COMP-57 | T/O2 | THFA | 25 | SR9003 | 40 | CN151 | 5 |
| COMP-58 | T/O2 | THFA | 30 | SR9003 | 35 | CN151 | 5 |
| COMP-59 | T/O2 | THFA | 30 | SR9003 | 40 | — | — |
| COMP-60 | T/O2 | THFMA | 20 | SR9003 | 25 | CN151 | 25 |
| COMP-61 | T/O2 | THFMA | 25 | SR9003 | 25 | CN151 | 20 |
| COMP-62 | T/O2 | THFMA | 30 | SR9003 | 20 | CN151 | 20 |
| COMP-63 | T/O2 | AAEMA | 30 | SR9003 | 35 | CN151 | 5 |
| COMP-64 | T/O2 | MAES | 30 | SR9003 | 40 | — | — |
| COMP-65 | T/O2 | MAES | 30 | SR9003 | 35 | CN151 | 5 |
| COMP-66 | T/O2 | DHPMA | 30 | SR9003 | 35 | CN151 | 5 |
| COMP-67 | T/O2 | DHPMA | 30 | SR9003 | 40 | — | — |
| COMP-68 | T/O2 | HBMA | 30 | SR9003 | 35 | CN151 | 5 |
| COMP-69 | T/O2 | DMA | 30 | SR9003 | 35 | CN151 | 5 |
| INV-1 | — | EOEOEMA | 42 | SR9003 | 50 | CN151 | 8 |
| INV-2 | T/O2 | EOEOEMA | 30 | SR9003 | 20 | CN151 | 20 |
| INV-3 | T/O2 | EOEOEMA | 30 | SR9003 | 35 | CN151 | 5 |
| INV-4 | T/O2 | EOEOEMA | 30 | DPGDA | 35 | CN151 | 5 |
| INV-5 | T/O2 | EOEOEMA | 30 | SR9003 | 40 | — | — |
| INV-6 | PB7 | EOEOEMA | 20 | SR9003 | 30 | CN151 | 20 |
| INV-7 | T/O2 | EOEOEMA | 26 | SR9003 | 40 | — | — |
| INV-8 | T/O2 | EOEOEMA | 20 | SR9003 | 30 | CN9001 | 20 |
| INV-9 | T/O2 | EOEOEMA | 20 | SR9003 | 30 | CN151 | 20 |
| INV-10 | T/O2 | EOEOEMA | 20 | SR9003 | 30 | CN976 | 20 |
| INV-11 | T/O2 | EOEOEMA | 25 | SR9003 | 5 | CN151 | 40 |
| INV-12 | T/O2 | EOEOEMA | 25 | SR9003 | 25 | CN151 | 20 |
| INV-13 | T/O2 | EOEOEMA | 30 | SR9003 | 5 | CN151 | 35 |

Evaluation and Results

Glass substrates were cleaned using isopropanol. The comparative UV curable inkjet inks COMP-1 to COMP-69 and the inventive UV curable inkjet inks INV-1 to INV-13 were coated on a glass substrate using a bar coater and a 20 μm wired bar. The samples were cured using a Fusion DRSE-120 conveyer, equipped with a Fusion VPS/I600 lamp (D-bulb), which transported the samples under the UV-lamp on a conveyer belt at a speed of 10 min/min. The adhesion on glass of each coated sample was tested. The results are shown in Table 7.

TABLE 7

| Ink | Monofunctional Monomer Ethoxylated methacrylate of Formula (I)? | wt % | Polyfunctional Monomer Propoxylated acrylate? | wt % | Polymerizable Oligomer wt % | Ratio | Adhesion on glass |
|---|---|---|---|---|---|---|---|
| COMP-1 | — | — | Yes | 25 | 45 | n.a. | 5 |
| COMP-2 | — | — | Yes | 40 | 30 | n.a. | 5 |
| COMP-3 | — | — | Yes | 55 | 15 | n.a. | 5 |
| COMP-4 | No | 20 | Yes | 30 | 20 | 1.50 | 5 |
| COMP-5 | No | 20 | Yes | 30 | 20 | 1.50 | 5 |
| COMP-6 | No | 20 | Yes | 30 | 20 | 1.50 | 5 |
| COMP-7 | No | 20 | Yes | 30 | 20 | 1.50 | 5 |
| COMP-8 | No | 20 | Yes | 30 | 20 | 1.50 | 5 |
| COMP-9 | No | 20 | Yes | 30 | 20 | 1.50 | 5 |
| COMP-10 | No | 25 | Yes | 40 | 5 | 1.60 | 5 |
| COMP-11 | No | 26 | Yes | 40 | — | 1.54 | 5 |
| COMP-12 | No | 30 | Yes | 35 | 5 | 1.17 | 5 |
| COMP-13 | No | 30 | Yes | 40 | — | 1.33 | 5 |
| COMP-14 | No | 30 | No | 30 | 5 | 1.00 | 5 |
| COMP-15 | No | 30 | No | 30 | 5 | 1.00 | 5 |
| COMP-16 | No | 30 | No | 30 | — | 1.00 | 5 |
| COMP-17 | No | 30 | No | 30 | — | 1.00 | 5 |
| COMP-18 | Yes | 5 | Yes | 25 | 40 | 5.00 | 5 |
| COMP-19 | Yes | 5 | Yes | 40 | 25 | 8.00 | 5 |
| COMP-20 | Yes | 5 | Yes | 55 | 10 | 11.00 | 5 |
| COMP-21 | Yes | 10 | Yes | 20 | 40 | 2.00 | 5 |

TABLE 7-continued

| Ink | Monofunctional Monomer Ethoxylated methacrylate of Formula (I)? | wt % | Polyfunctional Monomer Propoxylated acrylate? | wt % | Polymerizable Oligomer wt % | Ratio | Adhesion on glass |
|---|---|---|---|---|---|---|---|
| COMP-22 | Yes | 10 | Yes | 35 | 25 | 3.50 | 5 |
| COMP-23 | Yes | 10 | Yes | 55 | 5 | 5.50 | 5 |
| COMP-24 | Yes | 15 | Yes | 10 | 45 | 0.67 | 5 |
| COMP-25 | Yes | 15 | Yes | 30 | 25 | 2.00 | 5 |
| COMP-26 | Yes | 15 | Yes | 50 | 5 | 3.33 | 5 |
| COMP-27 | Yes | 20 | No | 30 | 20 | 1.50 | 5 |
| COMP-28 | Yes | 20 | No | 30 | 20 | 1.50 | 5 |
| COMP-29 | Yes | 20 | No | 30 | 20 | 1.50 | 5 |
| COMP-30 | Yes | 20 | No | 30 | 20 | 1.50 | 5 |
| COMP-31 | Yes | 20 | Yes | 5 | 45 | 0.25 | 5 |
| COMP-32 | Yes | 20 | Yes | 45 | 5 | 2.25 | 5 |
| COMP-33 | Yes | 25 | Yes | 40 | 5 | 1.60 | 4 |
| COMP-34 | Yes | 25 | Yes | 45 | — | 1.80 | 5 |
| COMP-35 | Yes | 30 | No | 35 | 5 | 1.17 | 5 |
| COMP-36 | Yes | 30 | No | 35 | 5 | 1.17 | 5 |
| COMP-37 | Yes | 30 | No | 35 | 5 | 1.17 | 4 |
| COMP-38 | Yes | 30 | No | 20 | 20 | 0.67 | 5 |
| COMP-39 | Yes | 30 | No | 20 | 20 | 0.67 | 4 |
| COMP-40 | No | 20 | Yes | 30 | 20 | 1.50 | 5 |
| COMP-41 | No | 25 | Yes | 40 | 5 | 1.60 | 5 |
| COMP-42 | No | 30 | Yes | 35 | 5 | 1.17 | 5 |
| COMP-43 | No | 30 | Yes | 40 | — | 1.33 | 5 |
| COMP-44 | No | 20 | Yes | 30 | 20 | 1.50 | 5 |
| COMP-45 | No | 25 | Yes | 40 | 5 | 1.60 | 4 |
| COMP-46 | No | 20 | Yes | 30 | 20 | 1.50 | 5 |
| COMP-47 | No | 25 | Yes | 40 | 5 | 1.60 | 5 |
| COMP-48 | No | 30 | Yes | 35 | 5 | 1.17 | 5 |
| COMP-49 | No | 30 | Yes | 40 | — | 1.33 | 5 |
| COMP-50 | No | 20 | Yes | 30 | 20 | 1.50 | 5 |
| COMP-51 | No | 25 | Yes | 40 | 5 | 1.60 | 4 |
| COMP-52 | No | 19 | Yes | 30 | 20 | 1.58 | 5 |
| COMP-53 | No | 19 | Yes | 30 | 20 | 1.58 | 5 |
| COMP-54 | No | 19 | Yes | 30 | 20 | 1.58 | 5 |
| COMP-55 | No | 19 | Yes | 30 | 20 | 1.58 | 5 |
| COMP-56 | No | 20 | Yes | 30 | 20 | 1.50 | 5 |
| COMP-57 | No | 25 | Yes | 40 | 5 | 1.60 | 4 |
| COMP-58 | No | 30 | Yes | 35 | 5 | 1.17 | 5 |
| COMP-59 | No | 30 | Yes | 40 | — | 1.33 | 5 |
| COMP-60 | No | 20 | Yes | 25 | 25 | 1.25 | 5 |
| COMP-61 | No | 25 | Yes | 25 | 20 | 1.00 | 5 |
| COMP-62 | No | 30 | Yes | 20 | 20 | 0.67 | 5 |
| COMP-63 | No | 30 | Yes | 35 | 5 | 1.17 | 5 |
| COMP-64 | No | 30 | Yes | 40 | — | 1.33 | 5 |
| COMP-65 | No | 30 | Yes | 35 | 5 | 1.17 | 5 |
| COMP-66 | No | 30 | Yes | 35 | 5 | 1.17 | 5 |
| COMP-67 | No | 30 | Yes | 40 | — | 1.33 | 5 |
| COMP-68 | No | 30 | Yes | 35 | 5 | 1.17 | 5 |
| COMP-69 | No | 30 | Yes | 35 | 5 | 1.17 | 5 |
| INV-1 | Yes | 42 | Yes | 50 | 8 | 1.19 | 0 |
| INV-2 | Yes | 30 | Yes | 20 | 20 | 0.67 | 0 |
| INV-3 | Yes | 30 | Yes | 35 | 5 | 1.17 | 1 |
| INV-4 | Yes | 30 | Yes | 35 | 5 | 1.17 | 1 |
| INV-5 | Yes | 30 | Yes | 40 | — | 1.33 | 0 |
| INV-6 | Yes | 20 | Yes | 30 | 20 | 1.50 | 1 |
| INV-7 | Yes | 26 | Yes | 40 | — | 1.54 | 2 |
| INV-8 | Yes | 20 | Yes | 30 | 20 | 1.50 | 0 |
| INV-9 | Yes | 20 | Yes | 30 | 20 | 1.50 | 3 |
| INV-10 | Yes | 20 | Yes | 30 | 20 | 1.50 | 1 |
| INV-11 | Yes | 25 | Yes | 5 | 40 | 0.20 | 3 |
| INV-12 | Yes | 25 | Yes | 25 | 20 | 1.00 | 0 |
| INV-13 | Yes | 30 | Yes | 5 | 35 | 0.17 | 0 |

From Table 7, it should be clear that only the UV curable inkjet inks INV-1 to INV-13 exhibited good to excellent adhesion results on unprimed glass.

A number of directly comparable inkjet inks were selected and coated on different metal surfaces using a bar coater and a 20 μm wired bar. The samples were cured using a Fusion DRSE-120 conveyer, equipped with a Fusion VPS/I600 lamp (D-bulb), which transported the samples under the UV-lamp on a conveyer belt at a speed of 10 min/min. The adhesion results are shown in Table 8. The metal surfaces on which the inkjet inks were tested are Al (Aluminium surface), Fe—S(stainless steel), Fe-G (galvanized steel), Fe—P (plain steel) and Cu (Copper surface).

TABLE 8

| Inkjet ink | Al | Fe-S | Fe-G | Fe-P | Cu | Viscosity (mPa · s at 45° C.) |
|---|---|---|---|---|---|---|
| COMP-5 | 5 | 5 | 5 | 5 | 5 | 30 |
| COMP-7 | 5 | 5 | 5 | 5 | 5 | 49 |
| COMP-8 | 4 | 4 | 5 | 5 | 2 | 25 |
| COMP-11 | 5 | 5 | 5 | 5 | 5 | 7 |
| COMP-27 | 5 | 5 | 5 | 5 | 5 | 57 |
| COMP-28 | 5 | 5 | 5 | 5 | 5 | 71 |
| COMP-29 | 5 | 5 | 5 | 5 | 5 | 49 |
| COMP-30 | 5 | 5 | 5 | 5 | 5 | 92 |
| COMP-40 | 5 | 5 | 5 | 5 | 5 | 39 |
| COMP-44 | 5 | 5 | 5 | 5 | 5 | 37 |
| INV-6 | 2 | 0 | 3 | 0 | 0 | 23 |
| INV-8 | 3 | 0 | 3 | 1 | 2 | 45 |
| INV-9 | 3 | 0 | 2 | 3 | 1 | 26 |
| INV-10 | 3 | 0 | 3 | 2 | 0 | 29 |

It can be seen from Table 8 that only the UV curable inkjet inks INV-6, and INV-8 to INV-10 exhibited good to excellent adhesion results on a wide range of metal surfaces.

The invention claimed is:

1. A UV curable inkjet ink comprising:
   a colorant;
   at least one free radical photoinitiator; and
   a polymerizable composition including at least 30 wt % based on a total weight of the UV curable inkjet ink of a mixture including 0 to 45 wt % of a polymerizable oligomer, 10 wt % to 40 wt % of a polyfunctional propoxylated acrylate, and at least 20 wt % of a monofunctional ethoxylated methacrylate according to Formula (I):

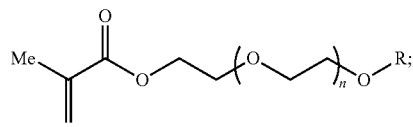

Formula (I)

wherein
n represents an integer of 1 to 4;
R represents an alkyl group; and
a weight ratio of the polyfunctional propoxylated acrylate to the monofunctional ethoxylated methacrylate is less than 1.60;
wherein the polymerizable composition includes at least 75 wt % of the polymerizable oligomer, the polyfunctional propoxylated acrylate, and the monofunctional ethoxylated methacrylate based on a total weight of the polymerizable composition;
wherein for a magenta inkjet ink, the colorant is a pigment consisting of a diketopyrrolo-pyrrole pigment, a quinacridone pigment, or a mixed crystal thereof; and
wherein for a yellow inkjet ink, the colorant is a pigment consisting of C.I. Pigment Yellow 150, C.I. Pigment Yellow 151, C.I. Pigment Yellow 155, or C.I. Pigment Yellow 180.

2. The UV curable inkjet ink according to claim 1, wherein the polyfunctional propoxylated acrylate is selected from the group consisting of dipropyleneglycol diacrylate and propoxylated neopentyl glycol diacrylate.

3. The UV curable inkjet ink according to claim 1, wherein the UV curable inkjet ink contains at least 30 wt % of the monofunctional ethoxylated methacrylate.

4. The UV curable inkjet ink according to claim 1, wherein the polymerizable oligomer is a urethane acrylate.

5. The UV curable inkjet ink according to claim 1, wherein the polymerizable oligomer is an epoxy acrylate.

6. The UV curable inkjet ink according to claim 1, wherein the monofunctional ethoxylated methacrylate is selected from the group consisting of:

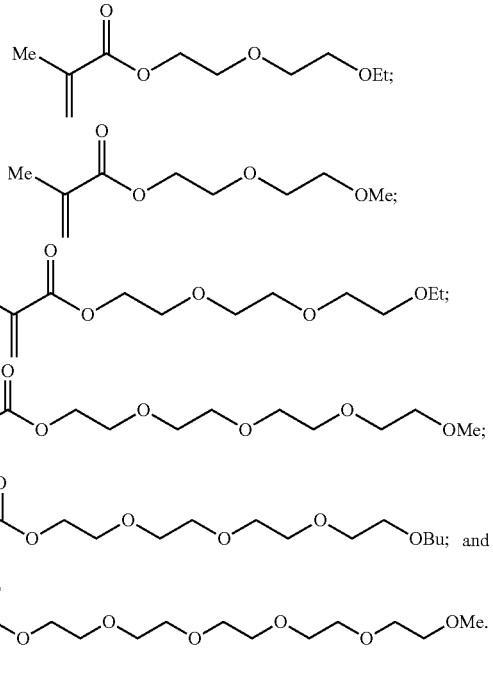

7. A decorative glass article comprising:
   a decorative layer formed from at least one UV curable inkjet ink according to claim 1.

8. The decorative glass article according to claim 7, further comprising a pair of glass sheets, wherein the decorative layer is located between the pair of glass sheets.

9. A method of manufacturing a UV curable inkjet ink according to claim 1 comprising the steps of:
   providing a polymerizable composition with one or more monomers and/or oligomers; and
   adding at least one free radical photoinititor to the polymerizable composition.

10. A UV curable inkjet printing method comprising the steps of:
   jetting at least one UV curable inkjet ink according to claim 1 on a substrate; and
   at least partially UV curing the at least one UV curable inkjet ink jetted on the substrate.

11. The UV curable inkjet printing method according to claim 10, wherein the substrate includes a glass surface or a metal surface.

12. A method for making decorative glass articles comprising:
   performing the UV curable inkjet printing method according to claim 11 to produce a decorative layer on a first glass sheet.

13. The method for making decorative glass articles according to claim 12, further comprising the step of:
   laminating the decorative layer formed on the first glass sheet to a second glass sheet such that the decorative layer is located between the first glass sheet and the second glass sheet.

14. The method for making decorative glass articles according to claim 13, further comprising the steps of:
   applying a double sided tape along edges of the first glass sheet on a side of the first glass sheet including the decorative layer;
   applying a second glass sheet onto the double sided tape and aligned with the first glass sheet;
   applying a curable liquid adhesive resin composition between the first glass sheet and the second glass sheet; and
   curing the curable liquid adhesive resin composition until a solid adhesive layer is obtained.

* * * * *